United States Patent [19]
Cowpland

[11] 3,989,902
[45] Nov. 2, 1976

[54] ALTERNATING CURRENT REGULATOR FOR USE WITH TELEPHONE TYPE LINE

[75] Inventor: Michael C. J. Cowpland, Ottawa, Canada

[73] Assignee: Mitel Canada Limited, Canada

[22] Filed: Oct. 23, 1974

[21] Appl. No.: 517,375

[30] Foreign Application Priority Data
June 14, 1974 Canada .................................. 202503

[52] U.S. Cl. ............................... 179/81 R; 179/16 F
[51] Int. Cl.² ........................................... H04M 1/00
[58] Field of Search ............ 179/84 VF, 84 R, 81 R, 179/81 A, 16 F, 170 T, 170.8, 170.2; 323/8, 16, 19, 22 T

[56] References Cited
UNITED STATES PATENTS

| | | | |
|---|---|---|---|
| 3,035,122 | 5/1962 | Livingstone | 179/16 F |
| 3,270,142 | 8/1966 | Wilson | 179/81 A |
| 3,393,274 | 7/1968 | Ingraham | 179/16 F |
| 3,508,009 | 4/1970 | Henry | 179/16 F |
| 3,748,399 | 7/1973 | Matsuda | 179/81 A |
| 3,800,095 | 3/1974 | Cowpland | 179/16 F |

Primary Examiner—Kathleen Claffy
Assistant Examiner—Joseph A. Popek
Attorney, Agent, or Firm—Craig & Antonelli

[57] ABSTRACT

A regulator which can be used in combination with equipment connected to a telephone type line. The regulator senses the amount of direct current being passed by the line and adjusts its internal AC impedance in inverse relationship thereto. This will shunt alternating current signals more severely when connected to short line loops having relatively small insertion loss, protecting a central office from excessive signal amplitudes.

9 Claims, 4 Drawing Figures

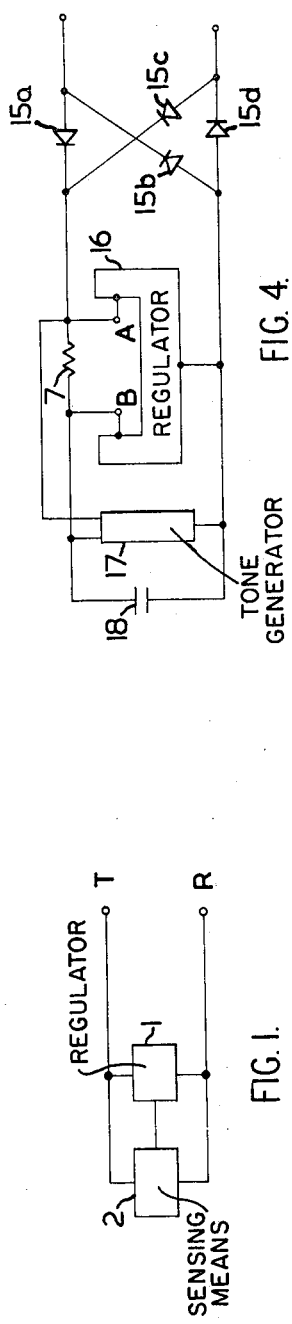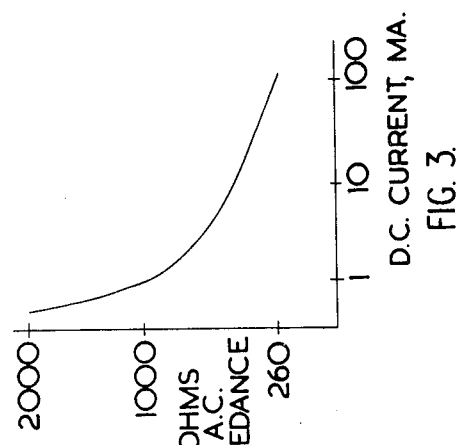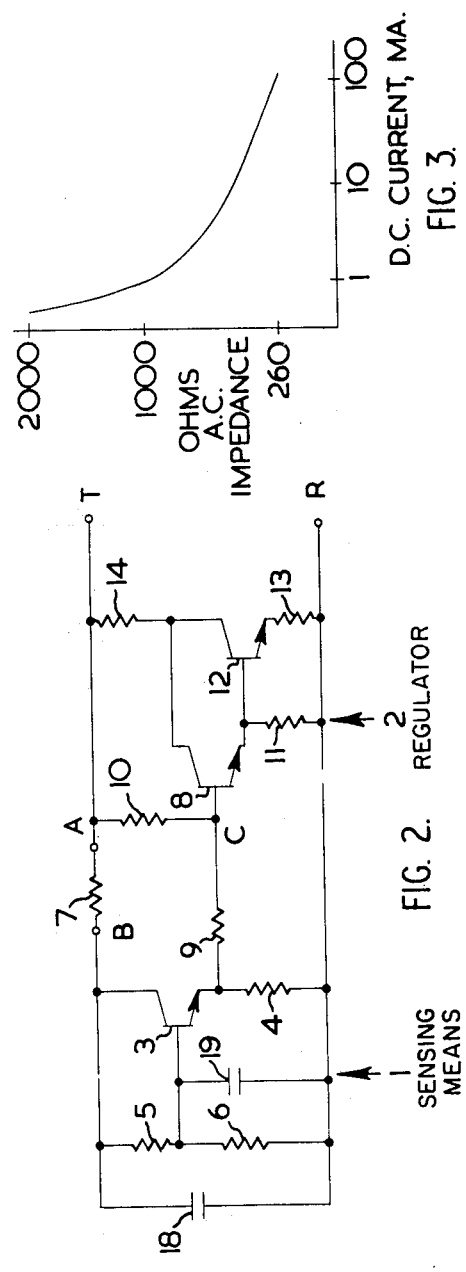

ALTERNATING CURRENT REGULATOR FOR USE WITH TELEPHONE TYPE LINE

This invention relates to a regulator which has a controllable AC impedance and is particularly useful for controlling the amplitude of the signal of a tone generator, which is applied to a telephone type line leading to a central office.

As the designs of telephone sets, data sets, and the like become more electronic in nature, the characteristics of the circuits must be made compatible with already existing equipment, particularly as viewed from a central office. Semi-conductor circuits, in utilizing current applied to the subscriber's loop, often present a very high impedance in comparison to other components which are connected to the line, such as the carbon microphone. Due to this increased impedance, and other inherent characteristics, such devices as tone generators and the like as used in multi-frequency push button telephone sets often will not work in a manner conforming to prescribed amplitude and impedance limits in a universal manner.

Telephone sets, multifrequency tone generators, etc. are connected to telephone lines of various lengths. Due to the transmission loss being greater in longer length of telephone line, it has been standard industry practice to increase the levels and sensitivity of sending and receiving circuitry such as speech networks and tone generators in order that they will operate at the end of long telephone lines. On short line lengths, use of the same circuits could result in excessive signal levels. Yet it is desirable to standardize and use the same circuitry for both long and short line lengths. Therefore it has been industry practice to provide a variable shunt regulator to load the speech networks and tone generators so as to reduce the signal levels applied to a central office for short telephone line lengths. This has conventionally been done using silicon carbide varistors in conjunction with inductors and other circuitry.

Silicon carbide varistors have been found to be imprecise components, and are expensive if matched and well controlled characteristics are required to ensure predictable performance. In addition, the varistor by itself does not allow separate control of AC and DC impedances, which is a desirable feature to obtain optimal characteristics for terminating a telephone line, and for regulating signal levels.

I have invented an electronic circuit which will allow control of the degree of impedance presented across the telephone line, the circuit being inexpensive and the impedance well controlled.

On short subscribers' loops the direct current drawn by the telephone set, which passes down the telephone line is relatively large due to low line resistance, whereas in long line lengths, the resistance is greater, and consequently the current drawn is smaller. Accordingly my regulator invention for controlling the AC impedance in shunt with the line comprises: means for connection to the line which senses the level of direct current carried by the line, and means for connection in shunt with the line under control of the means for sensing the level of direct current, which provides variable AC impedance inverse to the level of direct current sensed.

Accordingly, the impedance providing function is separated from the current sensing function, for particularly good control and flexibility.

A better understanding of the invention will be obtained by reference to the description below, and the drawings, in which:

FIG. 1 is a basic block schematic of the invention,
FIG. 2 is a detailed schematic circuit of one embodiment of the invention,
FIG. 3 is a direct current - AC impedance curve of the curve regulator, and
FIG. 4 is a block schematic of the regulator shown connected with a tone generator, etc.

FIG. 1 shows the invention in basic block schematic form. Terminals T and R are intended to be connected in shunt a telephone type line. While the description to follow will describe the invention used in conjunction with a tone generator which may be the multi-frequency generator in a push button telephone set, it is obvious that it can be used in other similar settings for the control of impedance across a line which carries direct current and alternating current.

It will also be appreciated that since the regulator presents a shunt impedance not only for alternating current, but also separately for direct current, and since it is normally used in conjunction with a line which has significant impedance, the variable impedance aspect of the regulator will control the voltage across it, effectively protecting to a predetermined degree electronic components such as the aforenoted tone generator or a telephone set from excessive voltages.

Sensing means 1 is connected to the T and R terminals for connection to the line, which senses the level of direct current carried by the line. An impedance shunt 2 is connected across the T and R terminals, for connection across the telephone line, which provides a variable impedance to alternating current inverse to the level of direct current sensed by the sensing means 1. The impedance shunt 2 is under control of the sensing means 1, and is therefore connected thereto.

Accordingly, the level of direct current in the tip and ring leads of the telephone line will be sensed by sensing means 1, and the greater the amplitude of current, the smaller AC impedance the shunt 2 will be controlled to exhibit. Accordingly, more AC current will be shunted through the current shunt, and tone signals which may be applied to the line will effectively by shunted through the shunting means 2.

In a longer subscriber's loop where the direct current flow in the tip and ring leads is correspondingly smaller, the smaller amount of direct current will be sensed and the shunt AC impedance will be caused to be greater, thereby shunting a reduced amount of tone signal therethrough.

The effect of the above will be to protect the central office from relatively high amplitude tone signals on a short loop, (which will reduce crosstalk and intermodulation in carrier systems), and allow the maximum amount of tone signal to be applied to the line at the end of long subscribers' loops which have high insertion loss. In addition, the tone generator will be protected from high voltage levels in a short loop, yet the regulator will allow adequate voltage to be applied to the tone generator at the end of long loops.

It has been found that a silicon diode is one of the best controlled and predictable impedance devices known, and therefore it is preferred that the impedance shunt 2 contain a silicon diode junction. This device is conveniently obtained as the base-emitter junction of a silicon transistor.

Turning now to FIG. 2, a current sensing means 1 is comprised of a first silicon transistor 3 connected in emitter follower configuration. A first emitter resistor 4 is connected between the emitter of the transistor 3 and ground. A voltage divider, which in this embodiment is comprised of serially connected resistors 5 and 6 have their junction connected to the base of transistor 3. One terminal of the voltage divider is connected to one lead terminal T through a decoupling resistor 7, and the other terminal is connected to ground, terminal R. A large valued capacitor 19 connects the base of transistor 3 to ground.

It will be noted that with the T and R terminals connected across the tip and ring leads of a telephone line, direct current will be passed through the voltage divider resistors 5 and 6. Any alternating current ripple which appears at the base of transistor 3 will be by-passed through capacitor 19.

It may be desirable for an external circuit that alternating current appearing across the voltage divider should be shunted as well to ground, and, for instance, a large valued capacitor 18, for instance of 1 microfarad may be connected thereacross.

The remainder of the circuit is the means for providing an AC impedance across the T and R terminals. Since the capacitor 18 (if provided) shunts the alternating current to ground, a decoupling resistor 7 is necessary in order to separate the direct current which flows through the voltage divider and is applied to transistor 3, from the complete signal appearing at the T and R terminals to avoid a direct capacitive load across the T and R terminals.

A second transistor 8 of the same polarity type as the first transistor 3 has its base connected by a stage coupling resistor 9 to the emitter of the first transistor 3, and through a second base resistor 10 to line terminal T. Its emitter is connected to ground through second emitter resistor 11.

A third transistor 12, of the same polarity type as the first and second transistors 3 and 8 has its base connected to the emitter of the second transistor 8, and its emitter connected to ground through third emitter resistor 13. Its collector is connected to the line terminal T through third collector resistor 14, and also has its collector connected to the collector of the second transistor 8.

In operation, it will be seen that a portion of the direct current flowing through the telephone line to which the T and R terminals are connected will flow through resistor 7, and through voltage divider resistors 5 and 6. External capacitor 18 (if provided) conducts any alternating current to ground, by-passing the voltage divider, while the direct current will flow through the voltage divider resistors 5 and 6. The direct current passing therethrough will cause a voltage to be applied to the base of transistor 3. Capacitor 19 removes any traces of any alternating current ripple which may be present at the base and by-passes it to ground.

At a predetermined operating point of transistor 3, transistor 12 will be caused to conduct, and begin shunting alternating and direct current across the T and R terminals.

The AC impedance of the circuit caused by transistor 12 at the T and R terminals has been found to be equal to the emitter circuit resistance (that is, the resistance of the emitter resistor 13 of the third transistor 12 plus the emitter diode resistance of that transistor), multiplied by the attenuation between the T terminal and the base of the second transistor 8.

As an example, let us assume that resistor 9 is 220 ohms., resistor 10 equal to 15K ohms., resistors 11 and 14 equal to 20 ohms each, and resistor 13 equal to 3.9 ohms.

Let us also assume that the circuit is currently conducting a large amount of current, say 100 milliamperes. The emitter resistance will be 3.9 ohms. plus the emitter resistance of silicon transistor 12 (roughly 0.26 ohms at 100 milliamperes). The attenuation from the T terminal to the base of transistor 8 will be approximately equal to the ratio of the value of resistor 10 to the value of resistor 9.

The AC impedance caused by transistor 12 across the T and R terminals will therefore be $(3.9 + 0.26)(15,000/220)$, which equals about 265 ohms.

The effect of other shunt impedances in the circuit will reduce the total AC impedance across the T and R terminals to about 250 ohms.

It has been found, that with respect to direct current, this circuit will maintain a constant voltage thereacross, of about 4 volts, similar to a zener diode, with a slope resistance of about 10 ohms.

In the event that the regulator carries a smaller amount of current, such as 1 milliampere, the emitter resistance of silicon transistor 12 is much greater, typically 26 ohms. Accordingly, the AC impedance caused by transistor 12 across the T and R terminals would be $(26 + 3.9)(15,000/220)$ equals 2,040 ohms. This would appear in parallel, for alternating currents, with the 2000 ohms in resistor 7, to show an AC impedance to the telephone line of about 1000 ohms. The DC impedance will still be low of the same order as that at high current levels.

It has been found that the third transistor 12 emitter resistance is approximately 26 ohms at 1 milliampere of current, 2.6 ohms at 10 milliamperes, and 0.26 ohms at 100 milliamperes.

Accordingly, it has been shown that with changes in current flow from 100 milliamperes to 1 milliampere, the overall AC impedance has been increased from about 250 ohms to about 1000 ohms. At the same time a very low DC impedance has been provided.

In the range of currents which will not cause enough voltage appearing across transistor 6 to initiate current flow in resistor 3, the entire circuit will be effectively shut off, and its impedance will be high. The AC impedance will be approximately the impedance of resistor 7.

Turning now to FIG. 3 shown is the AC impedance — direct current characteristic of the device. At low direct currents, the impedance to alternating currents will be approximately the same as the impedance of the resistor 7 (assuming a large external capacitor by-passing resistors 5 and 6), or about 2000 ohms in the circuit described.

Once turn on occurs, the AC impedance of the device decreases significantly. As the direct current increases, the AC impedance is seen to drop. By example in the curve shown, direct current of 100 milliamperes provides an AC impedance of about 250 ohms.

The turn-on voltage can be calculated by multiplying the number of base-emitter diodes of the three transistors in series $(3) \times (1 + R_5/R_6)$ where $R_5$ and $R_6$ are the respective resistances of resistors 5 and 6.

It will be noted that the resistance values calculated above are approximately those found in a normal telephone set, and it could be said that the regulator simulates the impedance characteristics thereof. It is therefore useful for connection to a telephone line where an electronic high impedance telephone set would normally require a varistor.

Resistor 7 in FIG. 2 has been shown connected to two terminals A and B, in order to illustrate that it need not form a part of this specific circuit, and may be used as part of an isolating resistor in a different part of the network within a telephone set. Shown in FIG. 4 is the basic schematic of such an environment. Terminals T and R are intended to be connected to the tip and ring leads of a telephone line. A diode bridge comprising diodes 15a, 15b, 15c, and 15d is connected in series with the leads leading to the T and R terminals, in order to insure the proper polarity of the current applied to the regulator circuit. With the circuit shown in FIG. 2, NPN transistors are used, and positive current should be applied to the T terminal. The diode bridge shown in FIG. 4 performs this function.

In series with one of the leads is resistor 7, also connected to terminals A and B as shown in FIG. 2. The regulator circuit 16 is connected thereto, as well as to ground which is connected to the R terminal. A tone generator 17 which is to be regulated is also connected across resistor 7 and to the ground terminal. Resistor 7 thus forms an isolating function for both the tone generator 17 and the regulator 16 at the same time. AC ripple capacitor 18 is connected in parallel with the tone generator and regulator at the decoupled portion of the circuit, in order to provide stable unmodulated DC therefor.

It may be seen that with short subscribers' loops, the regulator will shunt sufficient direct current from terminal A to ground to keep the potential applied via terminal B to the tone generator to a tolerably low level. Tone generated by the tone generator will also be shunted via terminal A to ground through the regulator to keep the AC signals generated by the tone generator low, so as not to overdrive equipment at the central office, cause cross talk, etc.

At low line current levels, however, the AC shunt impedance from terminal A to ground increases substantially, allowing a higher amplitude signal to be applied to the telephone line. The generated tone, of course, will appear as an alternating current signal which modulates the rectified direct current signal passing through the regulator, and hence will not be rectified by the bridge rectifier. It will be seen, therefore, that in order to provide an unrippling direct current to both the tone generator and the regulator for operation purposes, decoupling resistor 7 is a necessary element, which can be used in common.

It is believed that because the base-emitter diode of the silicon transistor turns on extremely smoothly, this circuit has been found to introduce practically no distortion. The turn-on voltage can be easily controlled by selection of the voltage divider ratio, and for the values in the example noted earlier, is approximately 4 volts. The AC impedance obtained is excellent for use in a telephone environment, and as noted can vary for the selected values between about 1000 ohms and 250 ohms, although series resistance in the line and selection of different component values can change them to the desired extent. The off impedance is high, about 2000 ohms, of little consequence across a telephone line.

Accordingly, I have invented an inexpensive, flexible, well controlled, and virtually non-distorting substitute for a varistor, which is useful in a broad variety of environments.

I claim:

1. A regulator for connection to a telephone type line for controlling AC impedance in shunt with the line, comprising:
   a. sensing means for connection to said line which senses the level of direct current carried by the line; and
   b. variable impedance means for connection in shunt with the line under control of said sensing means which provides a variable AC impedance inverse to the level of direct current sensed and a relatively constant D.C. impedance, said variable impedance means comprising a variable impedance device having an approximately constant high AC impedance when the direct current carried by said line is below a predetermined amplitude and an AC impedance which is inversely proportional to said direct current above the predetermined amplitude.

2. A regulator as defined in claim 1, in which said variable impedance means comprises a current controlled semiconductor variable impedance connected to the output of said sensing means.

3. A regulator as defined in claim 2, in which said current controlled semiconductor variable impedance includes a silicon diode junction.

4. A regulator as defined in claim 2, in which said current controlled semiconductor variable impedance comprises a transistor, the collector-emitter circuit of which is to be connected across the line.

5. A regulator for connection to a telephone type line comprising:
   a. a first transistor,
   b. a voltage divider comprising a pair of serially connected resistors, their junction being connected to the base of the transistor, one terminal of the voltage divider being connected to the collector of the transistor, the other terminal thereof being connected to ground,
   c. an emitter resistor connected between the emitter of the transistor and ground.
   d. a capacitor connected between the base of the transistor and ground,
   e. a decoupling resistor connected between the collector of the transistor and a line terminal, and
   f. variable A.C. impedance means including a control terminal connected to said transistor and a current shunt connected between ground and said line terminal, the current shunt including silicon diode means.

6. A regulator as defined in claim 5, further comprising a tone generator connected in parallel with said variable impedance means.

7. A regulator for connection to a telephone type line for controlling AC impedance in shunt with the line, comprising:
   a. sensing means for connection to said line which senses the level of direct current carried by the line, said sensing means comprising a silicon transistor connected in an emitter follower configuration, and a voltage divider and decoupling means connected in series across said line, the base of said silicon transistor being connected to a mid-point of said voltage divider;

b. variable impedance means under control of said sensing means for providing a variable AC impedance inverse to the level of direct current sensed and a relatively constant DC impedance comprising a first transistor connected to the output of said sensing means, the collector-emitter circuit of which is to be connected across the line; and c. shunt means connected to the base of said silicon transistor for removing any alternating current from said base which may appear at the voltage divider from said line.

8. A regulator as defined in claim 7, in which said variable impedance means further comprises:

a. a second transistor of the same polarity type as the first transistor, having its base connected to the line terminal by a second base resistor, and its emitter to ground through a second emitter resistor, b. a stage coupling resistor connected between the base of the second transistor and the emitter of the first transistor, c. a third transistor of the same polarity type as the second transistor, having its collector connected to the collector of the second transistor, and through a third collector resistor to the line terminal, its emitter through a third emitter resistor to ground and its base to the emitter of the second transistor.

9. A regular for connection to a telephone type line for controlling AC impedance in shunt with the line, comprising:

a. sensing means for connection to said line which senses the level of direct current carried by the line;

b. variable impedance means for connection in shunt with the line under control of said sensing means which provides a variable AC impedance inverse to the level of direct current sensed and a relatively constant DC impedance; and c. a tone generator connected in parallel with said variable impedance means.

* * * * *